(12) United States Patent
Skinner et al.

(10) Patent No.: US 6,382,356 B1
(45) Date of Patent: May 7, 2002

(54) MAN LIFT APPARATUS

(76) Inventors: Frank P. Skinner, 5330 Bayshore Ave., Cape Coral, FL (US) 33904; Shelmon G. Holmes, 8512 Ordinary Ave., Annandale, VA (US) 22003

( * ) Notice: Subject to any disclaimer, the term of this patent is extended or adjusted under 35 U.S.C. 154(b) by 0 days.

(21) Appl. No.: 09/816,469

(22) Filed: Mar. 26, 2001

(51) Int. Cl.[7] .............................................. A63B 27/00
(52) U.S. Cl. .................................. 182/133; 248/297.51
(58) Field of Search ................................ 182/133, 187, 182/134, 135, 136; 248/297.51

(56) References Cited

U.S. PATENT DOCUMENTS

| | | | |
|---|---|---|---|
| 144,498 A | * | 8/1873 | Edmonston |
| 647,945 A | * | 4/1900 | Cope |
| 4,694,934 A | * | 9/1987 | Erickson ..................... 182/133 |
| 4,809,815 A | * | 3/1989 | Wallace ....................... 182/133 |
| 4,830,143 A | * | 5/1989 | Fisher ........................ 182/135 |

FOREIGN PATENT DOCUMENTS

| | | | | |
|---|---|---|---|---|
| GB | 688047 | * | 2/1953 | ............. 248/297.51 |
| GB | 899467 | * | 6/1962 | ............. 248/297.51 |

\* cited by examiner

*Primary Examiner*—Alvin Chin-Shue
(74) *Attorney, Agent, or Firm*—Rodger H. Flagg

(57) ABSTRACT

The man lift apparatus comprises a handle secured to first and second arms which extend around an upright pole-type support for supporting a user at a selected position upon the upright pole-type support. When the handle is positioned substantially parallel to the upright pole-type support, the man lift apparatus may be removed, adjusted, raised or lowered upon the upright support. The user places the lift apparatus about the upright support, and moves the handle to a position which places a camming plate against the front side of the vertical support, with the second arm extending in an upward incline from the handle. The first arm extends in a first direction from the handle to engage a portion of a first side of the vertical support. The second arm extends in the opposite direction from the handle to engage the second side, back, and a portion of the first side of the vertical support. When the user places at least a portion of their weight upon the handle, the man lift apparatus engages the upright support to provide a stable means to support the user at a selected location on the upright support. Rope, cord, cable, chain or straps are removably secured to the man lift apparatus, to support a bosin s chair, seat harness, body harness, or support belt which is secured about the user.

18 Claims, 4 Drawing Sheets

MAN LIFT APPARATUS

BACKGROUND OF THE INVENTION

There is an established need to climb various upright structures, for maintenance or for performing various jobs not easily performed from the ground. Ship s masts at times require a person to climb the mast to unfurl sails, paint the mast, replace a pulley, etc. Other upright structures, such as trees require periodic maintenance, such as cutting out dead limbs, removing selected branches from around electric wires, etc. Telephone poles require periodic maintenance, requiring a repairman to climb the pole. Some building structures, such as steel frame high rise buildings require workers to perform work while suspended from a vertical column. Often the worker is at risk of injury from a fall, where no safe means for climbing the upright structure is provided. The man lift apparatus disclosed herein, provides a safe, adjustable means to support the user while climbing or working on an upright structure.

1. Field of the Invention

This invention relates to a man lift apparatus for climbing masts onboard ships, as well as climbing other vertical structures, such as trees, telephone poles, man-made construction frameworks, and other upright pole-type supports.

2. Background of the Invention

U.S. Pat. No. 4,595,076 issuing to Benjamin Gober, on Jun. 17, 1986 discloses a tree climbing apparatus having a metal strap attached on one side to a rectangular plate, and adjustably secured to the other side of the rectangular plate after encircling the strap around the tree.

U.S. Pat. No. 286,644 issuing to J. Seagrave and E. Fuller on Oct. 16, 1883 discloses a fire escape connected to an endless rope support from above by a pulley.

U.S. Pat. No. 4,407,391 issuing to Greenway et al on Oct. 4, 1983, discloses a safety device for pole climbers. A two hinged annular yoke portions are releasably secured about a pole, and pivoted blades mounted to the underside of the yoke are biased between a pole engaging position and a manually retractable position.

U.S. Pat. No. 4,520,895 issuing to James Armstrong on Jun. 4, 1985 discloses a building wall descent device having a manually operated brake means.

U.S. Pat. No. 5,351,783 issuing to Alfredo Celli on Oct. 4, 1994 discloses a self propelled vehicle for climbing pole-shaped elements, having a pair of counteracting wheels rotatable about a horizontal axis.

U.S. Pat. No. 3,968,858 issuing to Douglas Vollan et al. on Jul. 13, 1976 discloses a sailboat mast climbing device, utilizing a vertical track secured to the mast, and hand and feet climbing devices which are slidably received in the track. Each climbing device includes a brake for locking the climbing device to the mast.

U.S. Pat. No. 2,842,300 issuing to J. Johnson on Jul. 8, 1953 discloses a hand operated pole climbing aid, having a U-shaped central connecting portion with teeth, and lever arms vertically offset and raise the central connecting portion from the ends of the lever arms. A chain is secured between the lever arms to grip the pole when weight is applied to hand grips located at the ends of the lever arms.

SUMMARY OF THE INVENTION

The man lift apparatus comprises a handle secured to first and second arms which extend partially around an upright pole-type support for supporting a user at a selected position upon the upright support, when the handle is lowered to a substantially horizontal position.. When the handle is raised substantially parallel to upright pole-type support, the man lift apparatus may be removed, adjusted, raised or lowered upon the upright support. The user slides the lift apparatus upon the upright support, with the handle positioned substantially parallel with the upright structure. Once positioned about the upright support, the user lowers the handle to a position which places a camming plate against the front side of the upright pole-type support, with the second arm extending in an upward incline from the handle, which extends across a portion of the front side, the second side and the back side of the upright pole-type support. The first arm extends substantially horizontally in a first direction from the handle to at least partially engage a portion of the front side and the first side of the upright pole-type support. The second arm extends in a second, opposite, inclined direction from the handle to engage the second side, back, and a portion of the first side of the vertical support. The distal ends of the first and second arms are substantially parallel to each other, and spaced a distance greater than the cross-sectional thickness of the upright pole-type support. When the user places at least a portion of their weight upon the handle, the man lift apparatus engages the upright pole-type support to provide a stable means to support the user at a selected location on the upright support. Rope, cord, cable, chain or straps are preferably removably secured to the man lift apparatus, to support a bosin's chair, seat harness, body harness, or support belt, which is secured about the user, for safety.

BRIEF DESCRIPTION OF THE DRAWINGS

The above mentioned and other features and objects of the invention and the manner of obtaining them will become more apparent and the invention itself will be better understood by reference to the following description of embodiments of the invention take in conjunction with the accompanying drawings, wherein.

DETAILED DESCRIPTION OF THE SPECIFIC EMBODIMENTS

Figure 1:
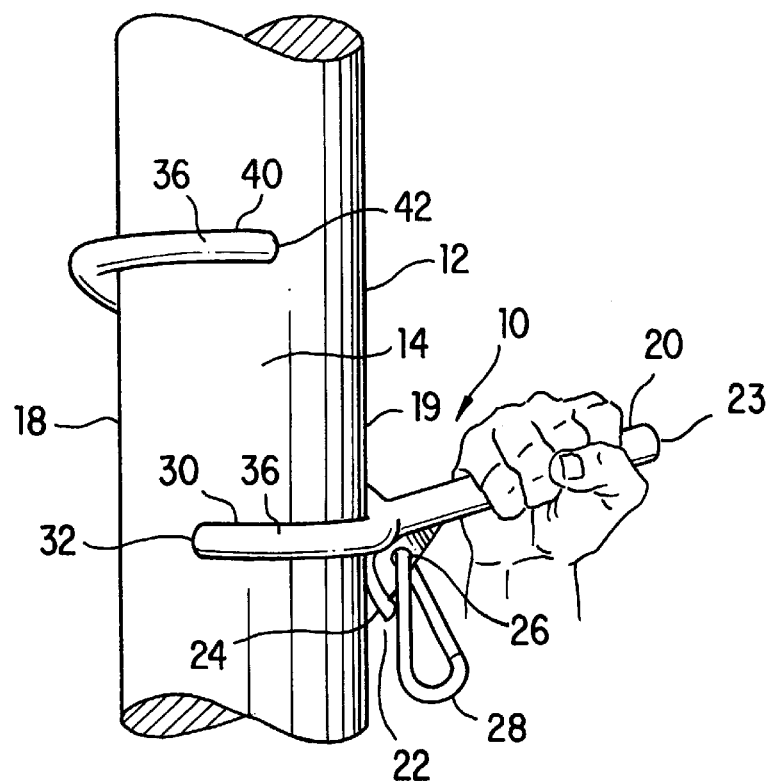
FIG. 1 is a side view of the man lift apparatus positioned upon an upright pole-type support, with the user's hand pulling on the handle to support the user.

FIG. 1 shows the man lift apparatus 10 positioned upon an upright pole-type structure 12, such as a mast, telephone pole, tree, or other upright round, oval, square, rectangular or multi-sided upright pole-type structure 12. For ease of disclosure, the first arm 30 of the man lift apparatus 10 is shown extending in a clockwise direction from handle 20, as shown by arrow 44 in FIG. 3. The second arm 40 is shown extending in an inclined, counter-clockwise direction from handle 20, as shown by arrow 34, in FIG. 3. It is well within the scope of this invention to reverse first and second arm directions, without adversely affecting the utility or performance of the man lift apparatus 10, and such modification is intended to fall within the scope of this disclosure, and the following claims.

As shown in FIG. 1, the handle 20 is positioned in a generally horizontal to slightly inclined position when a load, such as the users weight, is supported by the handle 20. Preferably, the handle 20 is inclined from zero degrees to thirty degrees above horizontal when supporting the weight of a user. The handle is preferably coated or wrapped with a suitable slip resistant gripping surface 21, which aids the grip of the user when supporting their weight upon the man lifting apparatus 10. The gripping surface 21 is preferably waterproof, and may be made of foam, rubber, plastic, leather, cloth or other suitable slip resistant, gripping material.

The handle 20 profile is preferably round, oval, rectangular, or multi-sided in cross sectional profile, and from three-quarters of an inch to two inches in cross sectional width. The handle 20 preferably extends from four and one-half (4½) inches to thirty-six (36) inches in length, with six (6) to eighteen (18) inches in length being most preferred. The distal end of handle 23 is preferably rounded.

A handle brace 22 extends from the handle 20 to a camming plate 24 which is positioned to abut a portion of the front side of the upright pole-type structure 12. The camming plate 24 is preferably curved, as shown in FIG. 1, FIG. 2, FIG. 6 and FIG. 7. The handle brace 22 may be secured to the handle 20 at one end, and to the camming plate 24 at the opposite end, by welding, gluing, molding, forming, or by other known means. The handle brace 22 preferably includes an aperture 26 therethrough, for ease in attaching a suitable life support connector 28, such as a D-ring, or snap-ring therethrough. The life support connector 28 may be used to releasably secure a rope or line between the man lift apparatus 10 and the user, for added safety.

Other types of support connectors 28 may also be used, such as a welded bracket, slot, ring bolt, pulley, etc. without departing from this disclosure, or from the scope of the following claims. The support connector 28 is intended for releasable securement to a suitable cord, rope, cable, chain or straps which in turn may be connected to a boson's chair 46, seat harness, belt harness, body harness, support belt, or the like, to provide additional safety and to at times support the user of the man lift apparatus 10.

The camming plate 24 extends below the handle 20, and engages the front side of the upright pole-type support 12 at a location below the handle 20, when the handle 20 is in a weight supporting position, as shown in FIG. 1. Preferably, the camming plate 24 is curved, and coated or otherwise covered with a slip resistant material, to resist slippage of the man lift apparatus 10 during use. The camming plate 24 preferably conforms to the adjacent front side portion of the upright pole-type support 12, when the handle is pivoted into the weight supporting position shown in FIG. 1.

Figure 2:
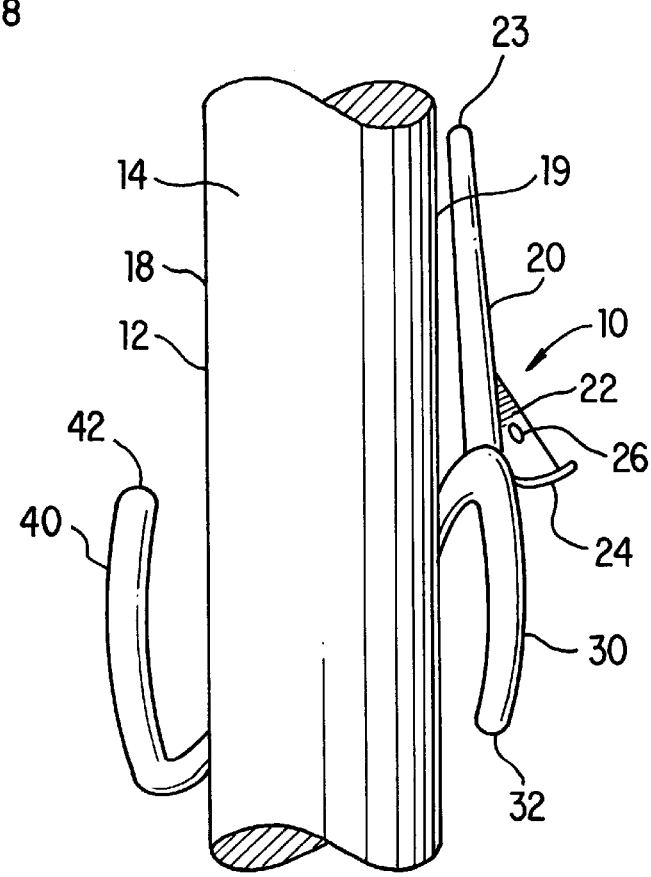
FIG. 2 is a side view of the man lift apparatus wherein the handle has been raised substantially parallel with the upright support, to allow the man lift apparatus to be inserted upon along one side of the upright support, or selectively raised or lowered upon the upright support, or removed therefrom.
Figure 3:
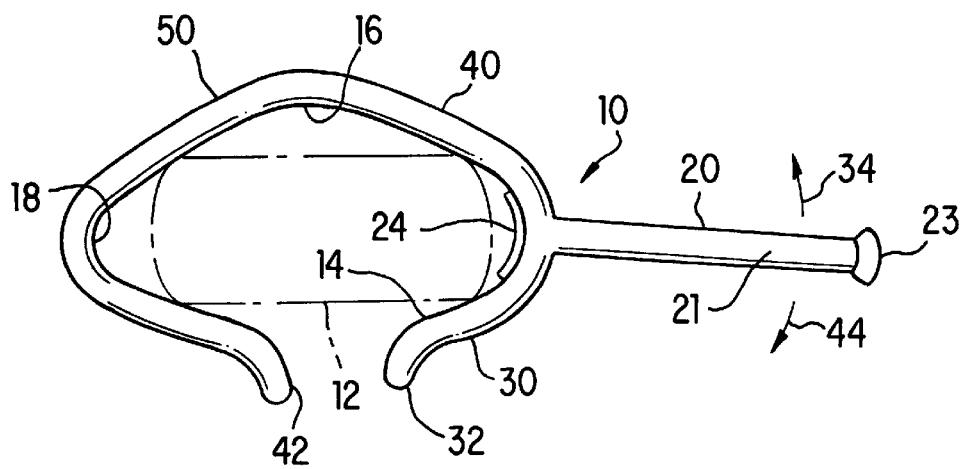
FIG. 3 is a top of the man lift apparatus adapted for use with a round or oval upright pole-type support.

A first arm 30 is sized to extend about ninety (90) degrees around the vertical pole-type support structure 12, in a substantially horizontal first direction from the handle 20, as shown by arrow 44, in FIG. 3. The first arm 30 extends across a portion of the front side, and at least partially around the first side of the vertical pole-type support in a substantially horizontal plane. Preferably, the first arm 30 extends about ninety (90) degrees around the vertical pole-type structure 14, in a first direction 44, as shown in FIG. 1. The distal end 32 of the first arm 30 is preferably rounded and biased outwardly, as shown in FIG. 3, to lessen abrasion on upright pole-type support 12. The first arm 30 is shown in a lowered, weight supporting position in FIG. 1. The distal arm 30 is shown in a raised, adjustable position in FIG. 2.

Figure 6:
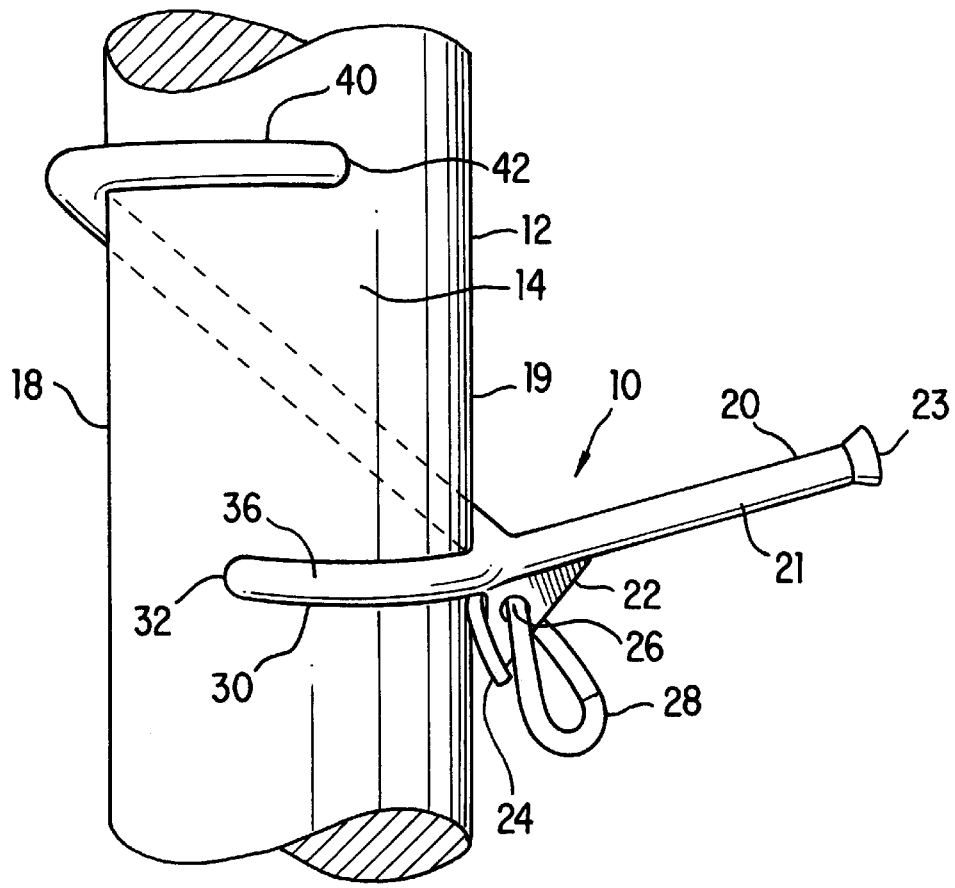
FIG. 6 is a detailed side view of the man lift apparatus, positioned upon an upright pole-type support, showing the far side of the man lift apparatus inclined in dashed lines.
Figure 7:
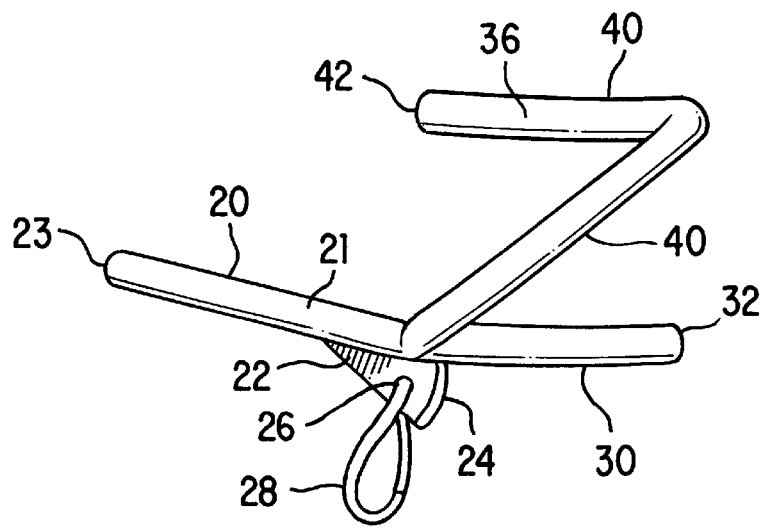
FIG. 7 is a side of the man lift apparatus shown prior to installation on an upright pole-type support.
Figure 8:
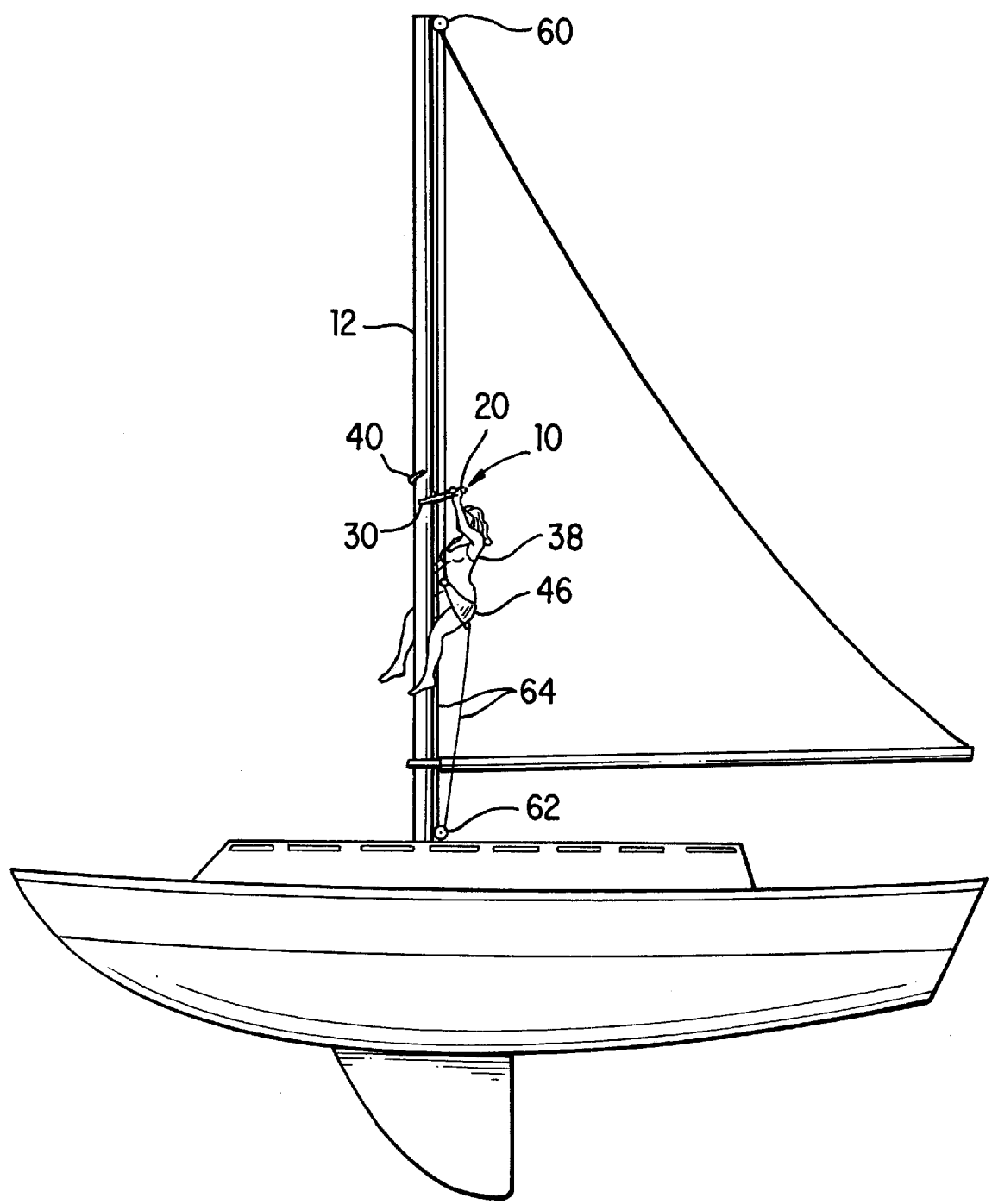
FIG. 8 is a side view of a sailboat, with a user supported upon the mast, with the aid of the man lift apparatus. A cable extends from pulleys located near the upper and lower ends of the upright pole-type structure, to support the user while the man lift apparatus is selectively moved to a new position on the upright pole-type structure.

A second arm 40 is sized to conform to the opposite side 16 of the physical profile of the upright pole-type structure 12, in a second direction from the handle 20, as shown by arrow 34 in FIG. 3. The second arm 40 extends about the upright pole-type structure 12 from one hundred and eighty (180) degrees to about two hundred and eighty (280) degrees in the second direction 34 from the location of the handle 20. The second arm 40 is upwardly inclined from thirty (30) degrees to sixty (60) degrees above the handle 20, when the handle 20 is in a horizontal, or slightly raised position, as best shown in FIG. 6. The distal end 42 of the second arm 40 is preferably rounded, and biased outwardly, as shown in FIG. 3, to lessen abrasion on upright pole-type support 12.

Figure 4:
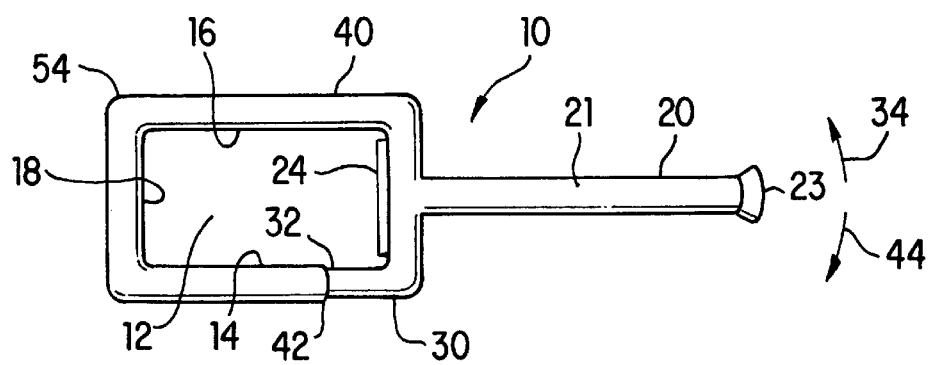
FIG. 4 is a top view of the man lift apparatus adapted for use with a square or rectangular upright pole-type support.
Figure 5:
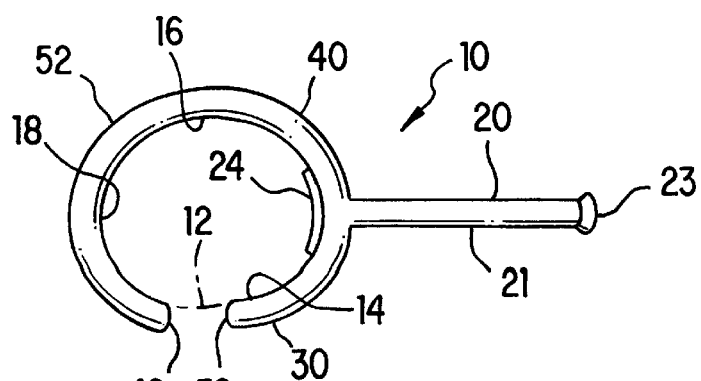
FIG. 5 is a top view of the man lift apparatus for use with circular upright pole-type support.

The first and second arms 30, 40 are preferably configured to be closely received about the opposing front and rear sides of a selected upright pole-type structure 12, and may comprise a generally oval or diamond configuration as shown in FIG. 3, a generally rectangular or square configuration, as shown in FIG. 4, or a generally round configuration, as shown in FIG. 5. Of course, it is within the scope of this disclosure, to adapt the man lift apparatus 10 to conform to other upright pole-type structures 12, such as a multi-sided pole-type structure 12 (not shown). The second arm 40 is preferably inclined from thirty (30) to sixty (60) degrees above the position of the handle 20 along the second side of the upright pole-type support 12, and then extends substantially parallel to the first arm 30 along the back side 18 and a portion of the first side 14 of the upright pole-type support 12. The distance between the parallel portions of the first and second arms 30, 40 is larger than the cross-sectional thickness of the upright pole-type support 12, to allow the man lift apparatus 10 to be slidably positioned upon the upright pole-type support, as shown in FIG. 2. As shown in FIG. 3, the first and second arms 30, 40 preferably contact the upright pole-type support at four locations, regardless of the shape of the upright pole type structure 12.

The distal ends of the first and second arms 30, 40 preferably extend substantially parallel to each other, as shown in FIG. 1, FIG. 2, FIG. 6 and FIG. 7, so that the man lift apparatus 10 may be slidably positioned about the upright pole-type structure 12, when the handle 20 is raised substantially parallel with the upright pole-type structure 12, as shown in FIG. 2. The distance between the first and second arms 30, 40 is preferably from one eighth inch to six inches larger than the cross sectional thickness of the upright pole-type structure 12.

The handle 20 and the first and second arms 30, 40 are made of any known material which support the weight of the user, and provide an additional safety factor during use. The safety factor is at least two to one, and is preferably selected to be between three-to-one and five to one, when supporting a user thereon. While stainless steel rod or tubing is preferred, because of its inherent strength and corrosion resistance; other materials may also be used, such as steel, aluminum, fiberglass, plastic, etc. In some applications, it is preferred to select a non-conductive material, or to coat the handle 20 and first and second arms 30, 40 with a non-conductive material.

The handle 20, first arm 30, second arm 40, camming plate 24 and handle brace 22 may be made by molding, or by forming, or may be welded or glued together to suit the materials and manufacturing processes used, providing that a suitable safety factor is maintained. The first and second arms 30, 40 are sized in accordance with the material selected, to provide the desired safety factor for use by a user in a selected size range.

The first and second arms 30, 40 are preferably coated with a slip resistant material 36 which will not mar or otherwise damage the outer surface 13 of the upright pole-type support 12.

A first pulley 60, such as a mast head pulley, is preferably secured near the top of the upright pole type structure 12, and a second pulley 62 is preferably secured near the base of the upright pole-type structure 12. A suitable line 64, such as a cord, rope or cable extends in a continuous loop between the first and second pulleys 60, 62. The user may be connected to the line 64 by any known means, such as a boson's chair 46, and may selectively raise or lower the line 64 while supporting their weight upon the man lift apparatus 10. Alternately, the user may secure the line to maintain their position on the upright pole-type support 12, while the man lift apparatus 10 is raised or lowered about the upright pole-type support 12.

In use, the man lift apparatus 10 is slidably positioned upon the upright pole-type support 12, with the handle raised substantially parallel to the upright pole-type structure 12, as shown in FIG. 2. The first arm 30 is positioned below the handle 20 on one side of the upright pole-type structure 12, while the second arm 40 is inclined on the second side, and extends substantially parallel to the first arm 30 on the back side of the upright pole-type structure 12. Because the distance between the arms 30, 40 is greater than the cross-sectional thickness of the upright pole-type structure 12, the man lift apparatus 10 is easily, slidably positioned about the upright pole-type structure 12.

Once positioned as shown in FIG. 2, the handle 20 is lowered to the position shown in FIG. 1, causing the first and second arms 30, 40 to engage opposing sides of the upright pole-type structure 12. When weight is applied to the handle 20, the man lift apparatus 10 grips the upright pole-type structure 12 to support the weight of the user, without slipping. The camming plate 24 provides additional frictional support, to keep the man lift apparatus 10 in place while weight is applied to the handle 20. When weight is removed from the handle 20, the handle 20 may be easily raised, tilting the man lift apparatus 10 so that the man lift apparatus 10 may be easily repositioned, or removed from the upright pole-type structure 12, as needed.

When the man lift apparatus 10 is positioned as shown in FIG. 1, the handle 20 is substantially horizontal, or elevated up to 30 degrees above horizontal. In this position, the first and second arms 30, 40 are positioned to abut the opposing, outer surface 13 of the upright pole-type structure 12 in at least four places. The user may then support all, or a portion of the user's weight upon the man lift apparatus 10, to aid in supporting the user's weight upon the upright pole-type support. Once safety secured at a desired height, the user may support their self upon the line 64, or upon a portion of the upright pole-type structure 12, while raising the handle 20 to reposition the man lift apparatus 10 at a higher location upon the upright pole-type structure 12.

Likewise, the man lift apparatus 10 may be selectively lowered as needed. Once the man lift apparatus 10 has been repositioned, the procedure is repeated, as needed, to climb or descend the upright pole-type support 12.

The man lift apparatus 10 disclosed herein, may be removed from the upright support 12 entirely, to reposition the man lift apparatus 10 at a new location on the upright support 12, or to avoid various objects secured to the upright pole-type support 12.

The man lift apparatus 10 is preferably positioned about the upright pole-type support 12 at a location above the user's shoulders, with the first and second arms 30, 40 extending in opposite directions about the upright pole-type support 12. A safety belt or harness may be connected by a suitable connecting means 28 to the man lift apparatus 10, for safety. In this embodiment, the first arm 30 extends in a substantially horizontal direction partially across the front side 19 and at least partially along the first side 14 of the upright pole-type support 12.

The second arm 40 extends in an opposite direction about a portion of the front side 19, and is upwardly inclined along the second side 16 of the upright pole-type support 12. The second arm 40 then extends parallel to the first arm along the back side 18 and a portion of the first side 14 of the upright pole-type support 12. When the user supports at least a portion of the user's weight upon the handle 20, the camming plate 24 is forced against the front side 19 of the upright support 12, while the portion of the second arm 40 extending across the back side 18 of the upright support 12 is wedged against the back side 18 of the upright pole-type support 12.

The more weight the user places upon the man lift apparatus 10, the more firmly the first and second arms 30, 40 grip the upright pole-type structure 12 to support the user while suspended from the man lift apparatus 10.

When it is desired to raise or lower the man lift apparatus 10, the user's weight is supported upon the upright pole-type structure 12 by a line 64, or by any known alternate means (not shown), while the handle 20 is raised to adjust the position of the man lift apparatus 10 upon the upright pole-type structure 12. Once repositioned at the desired location, the user lowers the handle 20 to engage the camming plate 24 against the front side 19 of the upright pole-type support 12. When the user places weight upon the handle 20, the first and second arms 30, 40 engage the upright pole-type support 12, to support the user 38 thereon. In this manner, the man lift apparatus 10 may be adjustably positioned at any desired location upon the upright, pole-type support 12.

Where an obstacle (not shown) interferes with the adjustable positioning of the man lift apparatus 10, such as a limb or attachment to a mast, the man lift apparatus 10 may be easily removed from the upright pole-type structure 12 by raising the handle 20 to a vertical position, substantially parallel to the front side 19 of the upright poletype support 12. In this position, the man lift apparatus 10 may be easily removed from the upright pole-type support 12, and repositioned above or below the obstacle. When the handle 20 is raised as shown in FIG. 2, the man lift apparatus 10 may also be easily raised or lowered along the upright pole-type support 12. When the handle 20 is lowered, as shown in FIG. 1, the man lift apparatus 10 will support the user's weight without slipping or sliding upon the upright pole-type support 12.

A second man lift apparatus 10 may also be used to selectively support the weight of the user upon the upright pole-type support 12. When two man lift apparatus 10 are used, one is used to support the user, while the other is moved to a desired location upon the upright pole-type support 12. In this embodiment, a first man lift apparatus 10 is positioned higher than a second man lift apparatus 10, and the user's weight is alternately supported upon one of the first and second man lift apparatus 10.

The outer surface 18 of the man lift apparatus 10 disclosed herein, may be treated or coated with a suitable protective finish. Preferably, the first and second arms 30, 40 and the portion of the camming plate in contact with the vertical support 12 are coated with a scratch resistant, slip resistant material, such as rubber or foam.

Thus, while a specific embodiment of the man lift apparatus 10 has been disclosed and described herein for purposes of illustration, the protection afforded by any patent which issues upon this application is not strictly limited to the disclosed embodiment; but rather extends to all structures and arrangements which fall fairly within the scope of the claims.

What is claimed is:

1. A man lift apparatus for climbing an upright pole-type support having at least a front side, a first side, a second side and a back side, which comprises:

a) a handle portion having a first end and a distal end;
   b) a first arm secured to the first end of said handle portion, the first arm sized to extend around a portion of the front side and at least a portion of the first side of said upright pole-type support in a first, generally horizontal direction when the handle is positioned in a generally horizontal weight supporting position;
   c) a second arm secured to the first end of said handle portion, the second arm sized to extend around a portion of the front side of said upright pole-type support, and extending across the second side of the upright pole-type support in an opposite, upwardly inclined direction when the handle portion is in a weight supporting position, said second arm further extending across the back side and at least a portion of the first side of the upright pole-type support in a parallel alignment with the first arm and spaced apart at a distance greater than a cross-sectional/thickness of the upright pole-type structure;
   d) a camming plate extending below the handle portion and positioned to abut the front side of the upright pole-type structure when the handle portion is positioned in a weight supporting position; and
   e) a handle brace secured at a first end to the handle portion and at a second end to the camming plate.

2. The man lift apparatus of claim 1, wherein the second arm is upwardly inclined from thirty degrees to sixty degrees along the second side of the man lift apparatus, and is substantially parallel to the first arm along the back side and at least a portion of the first side of the upright pole-type support, the parallel portion of the first and second arms are spaced from one-eighth inch to six inches greater than the cross-sectional thickness of the vertical support member, when the handle portion is raised to a generally vertical position substantially parallel with the upright pole-type support.

3. The man lift apparatus of claim 1, wherein the first and second arms are shaped to extend partially around an upright pole-type support having a cross-sectional shape selected from: round, oval, square, rectangular, and multi-sided.

4. The man lift apparatus of claim 1, wherein the first arm, the second arm, the camming plate, and the handle are coated with a slip-resistant gripping material.

5. The man lift apparatus of claim 4, wherein the slip resistant gripping material is selected from at least one of: rubber, plastic, fiberglass and foam.

6. the man lift apparatus of claim 1, wherein the first arm and the second arms are shaped to engage the upright pole-type support upon at least four locations, and sized to be from one eighth inch to six inches larger than the general cross sectional shape of the upright pole-type support.

7. The man lift apparatus of claim 1, wherein the preferred material for construction of the first and second arms, the handle, the camming plate and the handle brace, are selected from at least one of: stainless steel, aluminum, metal, plastic and fiberglass.

8. The man lift apparatus of claim 1, wherein an aperture extends through the handle brace, the aperture sized for attaching a life support connector thereto.

9. The man lift apparatus of claim 1, wherein the handle is sized to be from four and one-half inches long to thirty-six inches long.

10. A man lift apparatus for climbing an upright pole-type support having at least a front side, a first side, a second side and a back side, which comprises:

a) a handle portion having a first end and a rounded distal end, the handle sized to be from four and one-half inches long to thirty-six inches long, said handle coated with a slip resistant gripping surface;
   b) a first arm secured to the first end of said handle portion, the first arm sized to extend around a portion of the front side and at least a portion of the first side of said upright pole-type support, the first arm extending in a substantially horizontal direction when the handle is positioned in a weight supporting position, said first arm coated with a slip resistant gripping surface;
   c) a second arm secured to the first end of said handle portion, the second arm sized to extend around a portion of the front side of said upright pole-type support, the second arm extending across the second side of the upright pole-type support in an opposite, thirty degree to sixty degree upwardly inclined direction, when the handle portion is in a weight supporting position, said second arm further extending across the back side and at least a portion of the first side of the upright pole-type support in a parallel alignment with the first arm, the first arm and second arm spaced apart along the first side of the upright pole-type support at a distance greater than a cross-sectional thickness of the upright pole-type structure, said second arm coated with a slip resistant gripping surface;
   d) a curved camming plate extending below the handle portion and positioned to abut the front side of the upright pole-type structure when the handle portion is positioned in a weight supporting position; said camming plate coated with a slip resistant gripping surface, and
   e) a handle brace secured at a first end to the handle portion and at a second end to the camming plate, the handle brace with an aperture therethrough, the aperture sized for attaching a life support connector thereto.

11. The man lift apparatus of claim 10, wherein the parallel portion of the first and second arms are spaced from one-eighth inch to six inches greater than the cross-sectional shape of the upright pole-type support, when the handle portion is raised to a generally vertical position substantially parallel with the upright pole-type support.

12. The man lift apparatus of claim 11, wherein the first and second arms are shaped to extend at least partially around an upright pole-type support having a cross-sectional shape selected from: round, oval, square, rectangular, and multi-sided, and wherein the first and second arms are shaped to be slidably received about the upright pole-type support.

13. The man lift apparatus of claim 10, wherein the slip resistant gripping material is selected from at least one of: rubber, plastic, fiberglass and foam.

14. the man lift apparatus of claim 10, wherein the first arm and the second arm are shaped to extend around a general cross-sectional shape of the upright pole-type support, and sized to be from one eighth inch to six inches larger than the general cross sectional shape of the upright pole-type support.

15. The man lift apparatus of claim 10, wherein the preferred material for construction of the first and second arms, the handle, the camming plate and the handle brace, are selected from at least one of: stainless steel, aluminum, metal, plastic and fiberglass.

16. The man lift apparatus of claim 15, wherein the materials used to make the man lift apparatus are selected to be non-conductive.

17. A man lift apparatus for climbing an upright pole-type support having at least a front side, a first side, a second side and a back side, which comprises:

a) a handle portion having a first end and a rounded distal end, the handle sized to be from four and one-half inches long to sixteen inches long, said handle coated with a slip resistant gripping surface;

b) a first arm secured to the first end of said handle portion, the first arm sized to extend around a portion of the front side and at least a portion of the first side of said upright pole-type support in a first, the first arm extending in a substantially horizontal direction when the handle is positioned in a weight supporting position, said first arm coated with a slip resistant gripping surface;

c) a second arm secured to the first end of said handle portion, the second arm sized to extend around a portion of the front side of said upright pole-type support, the second arm extending across the second side of the upright pole-type support in an opposite, thirty degree to sixty degree upwardly inclined direction, when the handle portion is in a weight supporting position, said second arm further extending across the back side and at least a portion of the first side of the upright pole-type support in a parallel alignment with the first arm, the first arm and second arm spaced apart along the first side of the upright pole-type support at a distance from one-eighth inch to six inches greater than a cross-sectional thickness of the upright pole-type structure when the handle portion is in a the parallel portion of the first and second arms are spaced from one-eighth inch to six inches greater than the cross-sectional thickness of the vertical support member, when the handle portion is raised to a generally vertical position substantially parallel with the upright pole-type support, said second arm coated with a slip resistant gripping surface;

d) a curved camming plate extending below the handle portion and positioned to abut the front side of the upright pole-type structure when the handle portion is positioned in a weight supporting position; said camming plate coated with a slip resistant gripping surface, and e) a handle brace secured at a first end to the handle portion and at a second end to the camming plate, the handle brace with an aperture therethrough, the aperture sized for attaching a life support connector thereto.

18. The man lift apparatus of claim 17, wherein a single rod is used to form the first arm and the second arm, and the handle portion is secured to the single rod between the first arm and the second arm, and the distal ends of the first and second arms have rounded ends which extend outwardly.

* * * * *